United States Patent
Kim (10) Patent No.: US 11,285,973 B2
(45) Date of Patent: *Mar. 29, 2022

(54) APPARATUS AND METHOD FOR CONTROLLING MOTOR-DRIVEN POWER STEERING APPARATUS

(71) Applicant: HYUNDAI MOBIS CO., LTD., Seoul (KR)

(72) Inventor: Tae Hong Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 111 days.

This patent is subject to a terminal disclaimer.

(21) Appl. No.: 16/817,298

(22) Filed: Mar. 12, 2020

(65) Prior Publication Data

US 2021/0061313 A1 Mar. 4, 2021

(30) Foreign Application Priority Data

Aug. 30, 2019 (KR) .................. 10-2019-0107190

(51) Int. Cl.
 *B60W 60/00* (2020.01)
 *B60W 10/20* (2006.01)
 *B60W 50/00* (2006.01)

(52) U.S. Cl.
 CPC ........ *B60W 60/0053* (2020.02); *B60W 10/20* (2013.01); *B60W 2050/0022* (2013.01);
 (Continued)

(58) Field of Classification Search
 CPC ............. B60W 60/0053; B60W 10/20; B60W 2050/0022; B60W 2050/0055;
 (Continued)

(56) References Cited

U.S. PATENT DOCUMENTS

2009/0192679 A1* 7/2009 Kobayashi ........... B62D 5/0466
 701/42
2016/0334790 A1* 11/2016 Rust .......................... B60T 7/22
 (Continued)

FOREIGN PATENT DOCUMENTS

| JP | 2004-017881 A | 1/2004 |
| KR | 10-2017-0085633 A | 7/2017 |
| KR | 10-1779823 B1 | 10/2017 |

OTHER PUBLICATIONS

Machine translation of JP2004017881A (Year: 2004).*
Office Action of corresponding Korean Patent Application No. 10-2019-0107190—7 pages (dated Jun. 8, 2020).

*Primary Examiner* — Tyler J Lee
*Assistant Examiner* — Yufeng Zhang
(74) *Attorney, Agent, or Firm* — NSIP Law (57) ABSTRACT

An apparatus may include a driving information input unit for receiving driving information generated while a vehicle travels, a steering angle location control unit for receiving a command steering angle for autonomous driving and a current motor steering angle of a driving motor and outputting an autonomous driving command through location control, and a motor-driven power steering control unit for driving the driving motor based on the autonomous driving command in an autonomous driving mode, determining whether a driver intervenes in steering, based on the driving information during the autonomous driving, computing a driver command according to the driver' steering based on a result of the determination, computing a compensation output between the autonomous driving command and the driver command by applying a weighting according to a steering angular speed, and making a mode transition from the autonomous driving mode to a driver mode while driving the driving motor.

12 Claims, 4 Drawing Sheets

(52) U.S. Cl.
CPC ............... *B60W 2050/0055* (2013.01); *B60W 2510/202* (2013.01); *B60W 2510/205* (2013.01); *B60W 2520/10* (2013.01)

(58) Field of Classification Search
CPC ..... B60W 2510/202; B60W 2510/205; B60W 2520/10
See application file for complete search history.

(56) References Cited

U.S. PATENT DOCUMENTS

| | | | |
|---|---|---|---|
| 2017/0088174 A1* | 3/2017 | Inoue | B60T 8/17557 |
| 2017/0203788 A1* | 7/2017 | Heo | B62D 15/025 |
| 2018/0170422 A1* | 6/2018 | Yoshida | B62D 5/0463 |

* cited by examiner

APPARATUS AND METHOD FOR CONTROLLING MOTOR-DRIVEN POWER STEERING APPARATUS

CROSS-REFERENCE TO RELATED APPLICATION

The present application claims priority under 35 U.S.C. § 119(a) to Korean Patent Application No. 10-2019-0107190 filed on Aug. 30, 2019 in the Korean Intellectual Property Office, which is incorporated herein by reference in its entirety.

BACKGROUND

1. Technical Field

Embodiments of the present disclosure relate to an apparatus and method for controlling a motor-driven power steering (MDPS) apparatus, and more particularly, to an apparatus and method for controlling an MDPS apparatus, which enable an autonomous vehicle to make a mode transition without a sense of difference and can improve noise robustness against a command steering angle for autonomous driving by more clearly determining whether a driver intervenes in steering, when a mode of the autonomous vehicle switches from an autonomous driving mode to a manual mode and adjusting a transition speed based on an autonomous driving situation.

2. Related Art

With the recent development of the automobile technology, it is expected that autonomous vehicles capable of autonomous driving without a manipulation of a driver will be rapidly supplied. Such an autonomous vehicle refers to a vehicle capable of autonomous driving by controlling various sensors and a control system in an artificial intelligence way.

Furthermore, the autonomous vehicle can prevent an accident attributable to a driver's careless mistake or driving of an aggressive form, and has an advantage in that even unlicensed drivers, the blind, and minors can freely use the autonomous vehicle. In particular, a lot of research is carried out on the safety of the autonomous vehicle. For example, if a mode of the autonomous vehicle switches (or transitions) from an autonomous driving mode to a manual mode in which a driver directly manipulates the autonomous vehicle, research related to a technology for safely assigning, to a driver, the rights to control the vehicle is carried a lot.

However, there is insufficient research related to the field for maintaining stability (e.g., if stability is low, anxiety or distrust about autonomous driving may occur) provided to a driver while an autonomous vehicle travels in the autonomous driving mode.

For example, when the traveling speed of an autonomous vehicle changes (e.g., when the traveling speed changes from a low speed to a high speed or from a high speed to a low speed) during an autonomous driving mode operation, there is a problem in that a sense of difference may occur when an operation mode for control of MDPS (or an MDPS control mode) switches.

For example, if the traveling speed of an autonomous vehicle changes from a low speed to a high speed (or from a high speed to a low speed), an operation mode for MDPS control also changes from a location control mode to a torque control mode (or from the torque control mode to the location control mode). There is a problem in that an output difference occurs in an intermediate process in which an operation mode for control of an MDPS apparatus is changed as described.

If an output difference occurs in an intermediate process in which an operation mode for control of an MDPS apparatus is changed as described, there is a problem in that a passenger feels uneasy (i.e., stability is reduced).

Accordingly, there is a need for a method for preventing unwanted mode transition in addition to such a problem and enabling smooth mode transition based on an autonomous driving situation by more precisely detecting whether a driver intervenes in steering.

The related art of the disclosure is disclosed in Korean Patent No. 10-1779823 (Sep. 13, 2017, entitled "METHOD FOR SWITCHING THE CONTROL MODE IN AUTONOMOUS VEHICLE AND APPARATUS THEREOF").

SUMMARY

Various embodiments are directed to the provision of an apparatus and method for controlling an MDPS apparatus, which enable an autonomous vehicle to make a mode transition without a sense of difference and can improve noise robustness against a command steering angle in an autonomous driving mode by more clearly determining whether a driver intervenes in steering, when a mode of the autonomous vehicle switches from the autonomous driving mode to a manual mode and adjusting a transition speed based on an autonomous driving situation.

In an embodiment, an apparatus for controlling a motor-driven power steering (MDPS) apparatus includes a driving information input unit configured to receive driving information generated while a vehicle travels, a steering angle location control unit configured to receive a command steering angle for autonomous driving and a current motor steering angle of a driving motor and to output an autonomous driving command through location control, and an MDPS control unit configured to drive the driving motor based on the autonomous driving command received from the steering angle location control unit in an autonomous driving mode, determine whether a driver intervenes in steering, based on the driving information received from the driving information input unit during the autonomous driving, compute a driver command according to the driver' steering based on a result of the determination on whether the driver intervenes in steering, compute a compensation output between the autonomous driving command and the driver command by applying a weighting according to a steering angular speed, and make a mode transition from the autonomous driving mode to a driver mode while driving the driving motor.

In an embodiment, the driving information input unit may receive any one or more of a vehicle speed, the motor steering angle of the driving motor, and a steering angle, steering angular speed and column torque according to the driver' steering, while the vehicle travels.

In an embodiment, the steering angle location control unit may receive error values of the command steering angle and motor steering angle and filter out the error values through a variable high-pass filter for varying a cutoff frequency based on a command steering angular speed, adjust a location control gain, and output the autonomous driving command.

In an embodiment, the steering angle location control unit may lower the cutoff frequency when the command steering angular speed is high and raise the cutoff frequency when the command steering angular speed is low.

In an embodiment, the MDPS control unit may include a steering controller configured to compute the driver command according to the driver' steering based on a vehicle speed, steering angle and column torque received from the driving information input unit, a steering intervention determination unit configured to receive the steering angle, the motor steering angle and the column torque and to determine whether the driver intervenes in steering, based on a result of a comparison between retention times of the column torques and phases of the steering angle and motor steering angle, a weighting calculator configured to determine a blending cycle and weighting for compensating for the autonomous driving command and the driver command based on the steering angular speed when an operation mode switches, and an output controller configured to compute the compensation output in such a way as to compensate for the autonomous driving command and the driver command by applying the weighting based on the blending cycle determined by the weighting calculator if the steering intervention determination unit determines that the driver has intervened in steering and to output the compensation output.

In an embodiment, the steering intervention determination unit may determine that the driver has intervened in steering if the column torque is maintained to a set torque or more for a set time or more and the phase of the steering angle is faster as a result of a comparison between the phases of the steering angle and the motor steering angle.

In an embodiment, the output controller may compute the compensation output using an equation [(1−weighting)*autonomous driving command+weighting*driver command] while increasing the weighting from 0 to 1 based on the blending cycle.

In an embodiment, a method of controlling a motor-driven power steering (MDPS) apparatus includes receiving, by an MDPS control unit, an autonomous driving command from a steering angle location control unit and driving a driving motor in an autonomous driving mode, determining, by the MDPS control unit, whether a driver intervenes in steering, based on driving information received from a driving information input unit during autonomous driving, computing, by the MDPS control unit, a driver command according to the driver' steering if it is determined that the driver has intervened in steering, computing, by the MDPS control unit, a compensation output between the autonomous driving command and the driver command by applying weighting according to a steering angular speed, and making a mode transition, by the MDPS control unit, from the autonomous driving mode to a driver mode while driving the driving motor using the compensation output.

In an embodiment, the determining of whether the driver intervenes in steering may include receiving, by the MDPS control unit, a steering angle, a motor steering angle and a column torque, and determining that the driver has intervened in steering if the column torque is maintained to a set torque or more for a set time or more and a phase of the steering angle is faster as a result of a comparison between the phases of the steering angle and the motor steering angle.

In an embodiment, the computing of the compensation output may include determining, by the MDPS control unit, a blending cycle and weighting for compensating for the autonomous driving command and the driver command based on the steering angular speed, and computing, by the MDPS control unit, the compensation output in such a way as to compensating for the autonomous driving command and the driver command by applying the weighting based on the determined blending cycle.

In an embodiment, the computing of the compensation output may include computing, by the MDPS control unit, the compensation output using an equation [(1−weighting)*autonomous driving command+weighting*driver command] while increasing the weighting from 0 to 1 based on the blending cycle.

In an embodiment, the method may further include receiving, by the steering angle location control unit, error values of the command steering angle and motor steering angle and filtering out the error values through a variable high-pass filter for varying a cutoff frequency based on a command steering angular speed, adjusting a location control gain, and outputting the autonomous driving command to the MDPS control unit.

In an embodiment, when varying the cutoff frequency, the steering angle location control unit may lower the cutoff frequency when the command steering angular speed is high and raise the cutoff frequency when the command steering angular speed is low.

DETAILED DESCRIPTION

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an apparatus and method for controlling a motor-driven power steering (MDPS) apparatus will be described below with reference to the accompanying drawings through various examples of embodiments. In such a process, the thickness of a line or the size of an element illustrated in the drawings may have been exaggerated for the clarity of a description and for convenience' sake. Terms to be described below have been defined by taking into consideration their functions in the present disclosure, and may be different depending on an operator's intention or practice. Accordingly, such terms should be interpreted based on overall contents of this specification.

Figure 1:
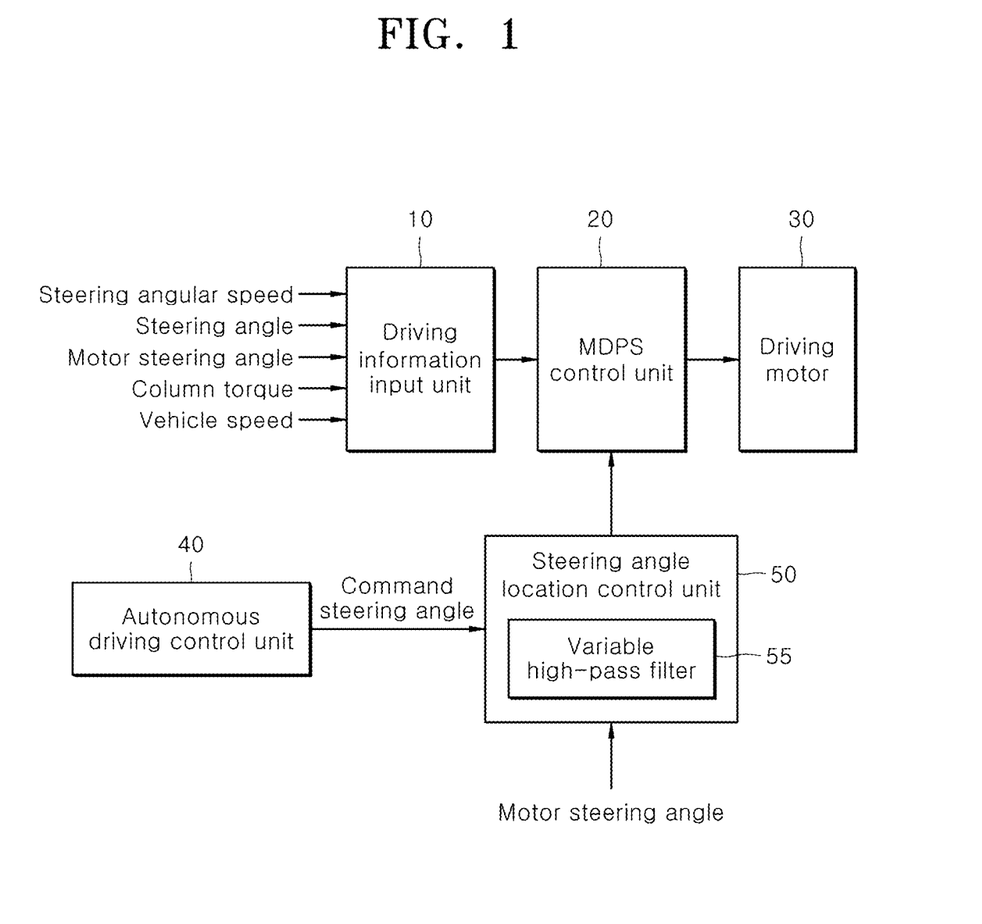
FIG. 1 is a schematic configuration diagram illustrating an apparatus for controlling an MDPS apparatus according to an embodiment of the disclosure.
Figure 2:
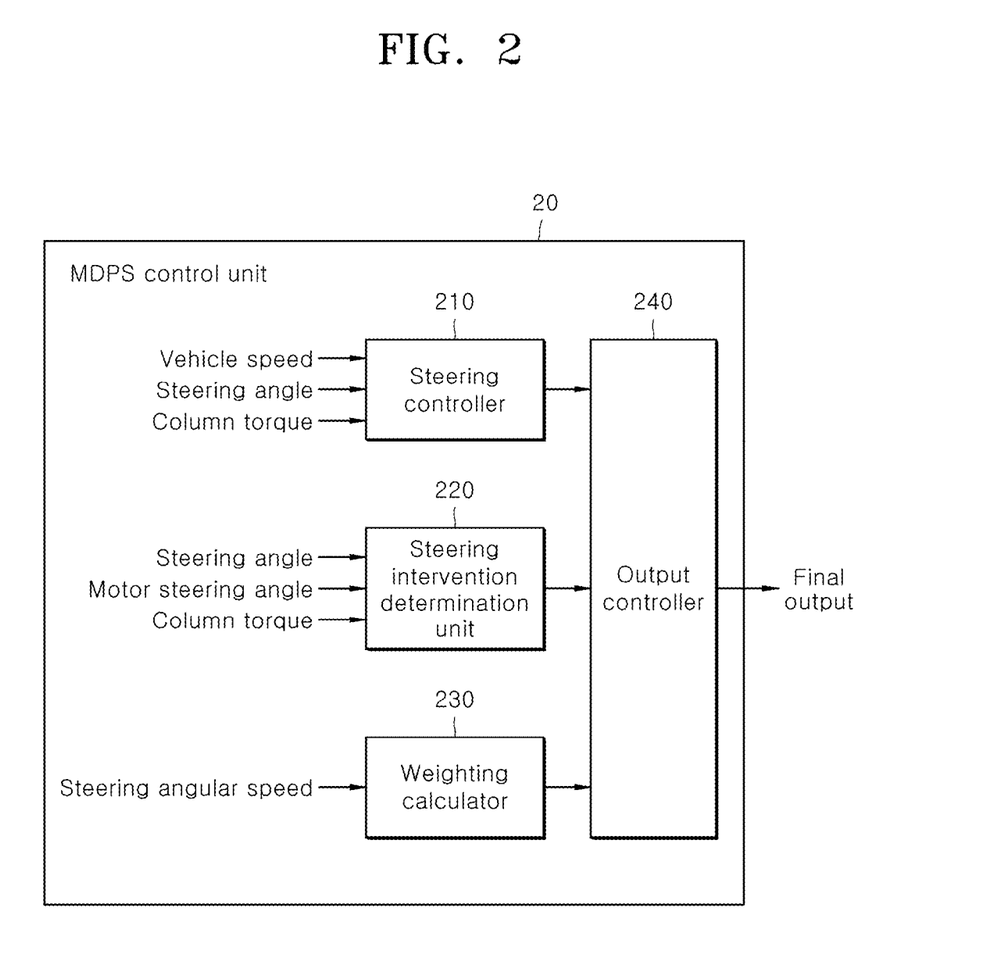
FIG. 2 is a more detailed block diagram of an MDPS control unit in the apparatus for controlling an MDPS apparatus according to an embodiment of the disclosure.
Figure 3:
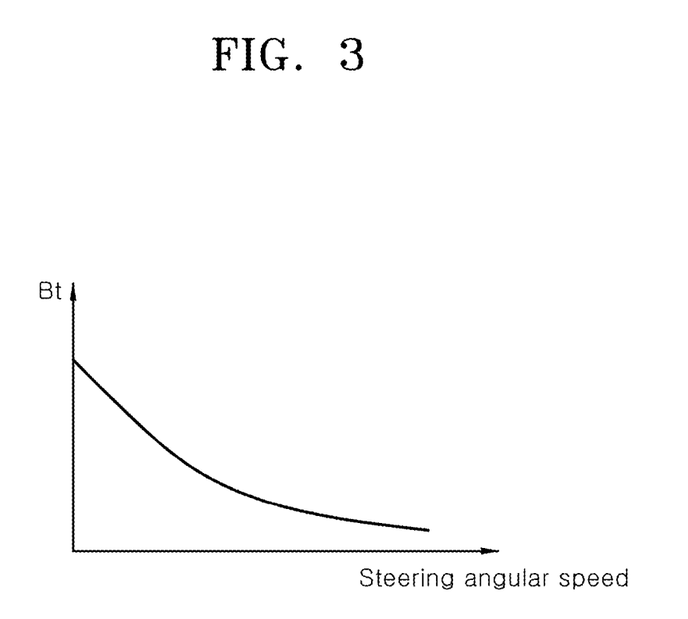
FIG. 3 is a graph illustrating an example of a blending cycle according to steering angular speeds in the apparatus for controlling an MDPS apparatus according to an embodiment of the disclosure.

FIG. 1 is a schematic configuration diagram illustrating an apparatus for controlling an MDPS apparatus according to an embodiment of the disclosure. FIG. 2 is a more detailed block diagram of an MDPS control unit in the apparatus for controlling an MDPS apparatus according to an embodiment of the disclosure. FIG. 3 is a graph illustrating an example of a blending cycle according to steering angular speeds in the apparatus for controlling an MDPS apparatus according to an embodiment of the disclosure.

As illustrated in FIGS. 1 and 2, the apparatus for controlling an MDPS apparatus according to an embodiment of the disclosure may include a driving information input unit 10, a steering angle location control unit 50 and an MDPS control unit 20.

The driving information input unit 10 receives driving information generated while a vehicle travels and provides the driving information to the MDPS control unit 20 so that the MDPS control unit 20 may determine whether a driver intervenes in steering and compute a driver command according to the driver' steering to control a driving motor 30.

In this case, the driving information may include any one or more of a vehicle speed, the motor steering angle of the driving motor 30, and a steering angle, steering angular speed and column torque according to a driver' steering, while the vehicle travels. The driving information input unit 10 may receive the column torque whose noise is removed through a low frequency pass filter.

The steering angle location control unit 50 receives a command steering angle for autonomous driving from an autonomous driving control unit 40, receives a current motor steering angle of the driving motor 30, and outputs an autonomous driving command to the MDPS control unit 20 through location control so that steering is performed by controlling the driving motor 30 in an autonomous driving mode.

In this case, the steering angle location control unit 50 may receive error values of the command steering angle and the motor steering angle and may filter out the error values through a variable high-pass filter 55 for varying a cutoff frequency based on a command steering angular speed, may adjust a location control gain, and may output the autonomous driving command.

Accordingly, if the command steering angular speed is high, the steering angle location control unit 50 may raise a required gain and frequency response in a steering area by lowering the cutoff frequency. If the command steering angular speed is low, the steering angle location control unit 50 may make the cutoff frequency insensitive to noise by raising the cutoff frequency, thereby enabling the cutoff frequency not to respond to vibration or disturbance, and significantly improving responsiveness.

In this case, the command steering angular speed may be calculated by differentiating the command steering angle.

The MDPS control unit 20 may drive the driving motor 30 based on the autonomous driving command received from the steering angle location control unit 50 in the autonomous driving mode.

Furthermore, the MDPS control unit 20 may determine whether a driver intervenes in steering, based on driving information received from the driving information input unit 10 during the autonomous driving, may compute the driver command based on a driver' steering based on a result of the determination on whether the driver intervenes in steering, may compute a compensation output between the autonomous driving command and the driver command by applying a weighting according to a steering angular speed, and may make a mode transition from the autonomous driving mode to a driver mode while driving the driving motor 30.

The MDPS control unit 20 may include a steering controller 210, a steering intervention determination unit 220, a weighting calculator 230, and an output controller 240.

The steering controller 210 may compute the driver command according to the driver' steering based on a vehicle speed, steering angle and column torque received from the driving information input unit 10. That is, the steering controller 210 may generate an auxiliary power when the driver performs steering in the driver mode.

The steering intervention determination unit 220 may receive a steering angle, motor steering angle and column torque from the driving information input unit 10, and may determine whether a driver intervenes in steering, based on a result of a comparison between the retention times of column torques and the phases of the steering angle and the motor steering angle.

In this case, if the column torque is maintained to a set torque or more for a set time or more and the phase of the steering angle is faster as a result of a comparison between the phases of the steering angle and the motor steering angle, the steering intervention determination unit 220 may determine that the driver has intervened in steering.

When a driver intervenes in steering during autonomous driving, a column torque rises due to the torsion of a torsion bar (not illustrated) if steering is more rapidly performed in a direction opposite or equal to an autonomous driving direction. Accordingly, whether the driver intervenes in steering may be determined based on the column torque, but the column torque may rise due to the driver's unintended steering wheel touch or tire shaking according to a road condition. In order to more accurately determine whether the driver intervenes in steering, the steering intervention determination unit 220 compares the phases of a steering angle and a motor steering angle.

If a driver performs steering, a steering angle measured in a steering wheel has a faster phase than a motor steering angle calculated in the driving motor 30. In contrast, in the case of autonomous driving, a motor steering angle calculated in the driving motor 30 has a faster phase than a steering angle measured in the steering wheel.

Accordingly, the steering intervention determination unit 220 may determine whether a driver intervenes in steering, based on the steering angle or motor steering angle having a faster phase by comparing the phases of the steering angle and the motor steering angle.

The weighting calculator 230 may determine a blending cycle and weighting for compensating for the autonomous driving command and the driver command based on a steering angular speed when an operation mode switches.

As illustrated in FIG. 3, a blending cycle Bt is configured based on steering angular speeds in a table form in an exponential function way. If a driver wants sudden steering, the blending cycle Bt is reduced and thus weighting is immediately changed. If a steering angular speed is slow, the blending cycle Bt is increased and thus weighting is slowly changed. Accordingly, an operation mode can switch without a sense of difference.

If the steering intervention determination unit 220 determines that the driver has intervened in steering, the output controller 240 may compute a compensation output in such a way as to compensate for the autonomous driving command and the driver command by applying weighting based on a blending cycle determined by the weighting calculator 230, and may output the compensation output.

That is, the output controller 240 may compute a compensation output using an equation [(1−weighting)*autonomous driving command+weighting*driver command] while increasing weighting from 0 to 1 based on a blending cycle. In this case, if the weighting is 0, the autonomous driving command may be computed as the compensation output of 100%. If the weighting is 1, the driver command may be computed as the compensation output of 100%.

Accordingly, if a mode rapidly switches or fast transition is not necessary, depending on a driver' steering angular speed for each situation, outputs may be slowly blended, and thus a smooth sense of steering can be provided when the autonomous driving mode switches to the driver mode due to the driver's intervention in steering.

As described above, the apparatus for controlling an MDPS apparatus according to an embodiment of the disclosure can maximize user convenience and safety because an autonomous vehicle can make a mode transition without a sense of difference and noise robustness against a command steering angle in an autonomous driving mode can be improved by more clearly determining whether a driver intervenes in steering, when a mode of the autonomous vehicle switches from the autonomous driving mode to a manual mode and adjusting a transition speed based on an autonomous driving situation.

Figure 4:
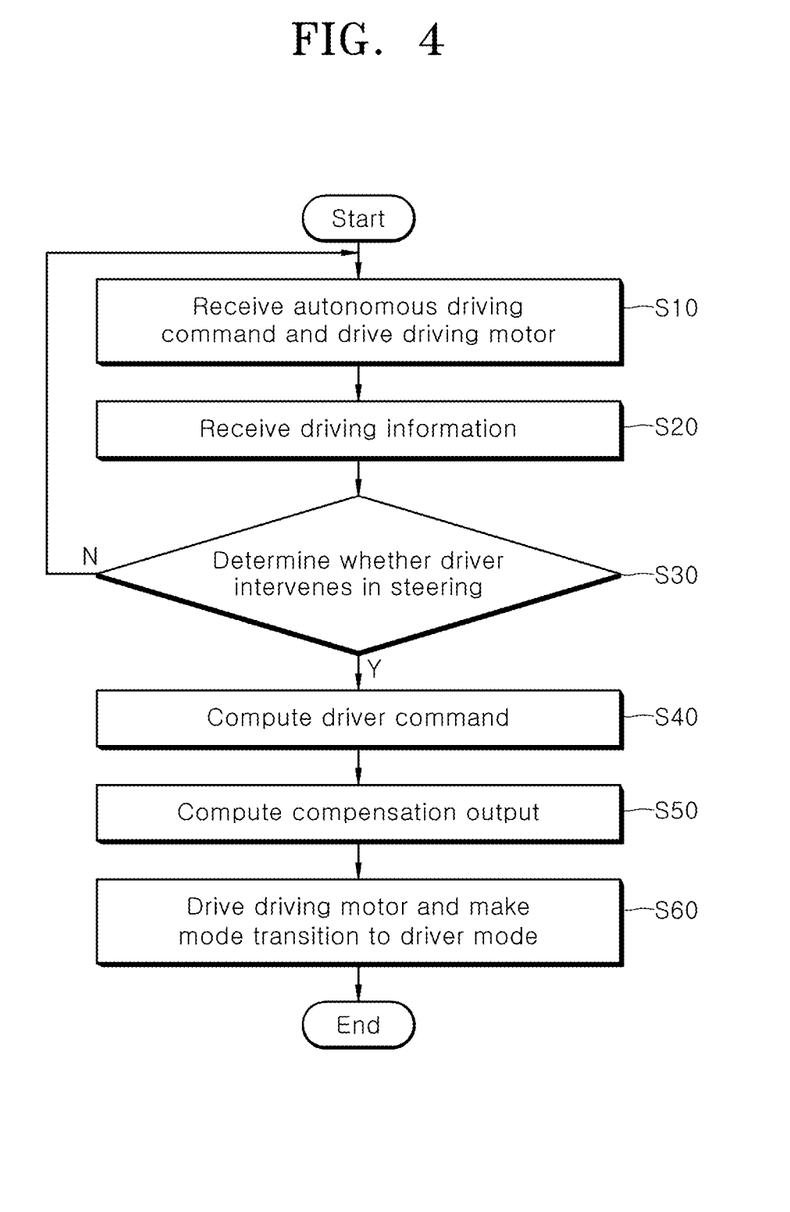
FIG. 4 is a flowchart for describing a method of controlling an MDPS apparatus according to an embodiment of the disclosure.

FIG. 4 is a flowchart for describing a method of controlling an MDPS apparatus according to an embodiment of the disclosure.

As illustrated in FIG. 4, in the method of controlling an MDPS apparatus according to an embodiment of the disclosure, the MDPS control unit 20 receives an autonomous driving command from the steering angle location control unit 50 and drives the driving motor 30 in the autonomous driving mode (S10).

In this case, the steering angle location control unit 50 may receive error values of a command steering angle and motor steering angle and may filter out the error values through the variable high-pass filter 55 for varying a cutoff frequency based on a command steering angular speed, may adjust a location control gain, and may output the autonomous driving command to the MDPS control unit 20.

When varying the cutoff frequency of the variable high-pass filter 55, the steering angle location control unit 50 may raise a required gain and frequency response in a steering area by lowering the cutoff frequency if the command steering angular speed is high, and may make the cutoff frequency insensitive to noise by raising the cutoff frequency if the command steering angular speed is low, thereby enabling the cutoff frequency not to respond to vibration or disturbance and significantly improving responsiveness.

While driving the driving motor 30 based on the autonomous driving command received at step S10, the MDPS control unit 20 receives driving information of a vehicle from the driving information input unit 10 during autonomous driving (S20).

In this case, the driving information of the vehicle may include any one or more of a vehicle speed, the motor steering angle of the driving motor 30, and a steering angle, steering angular speed and column torque according to a driver' steering, while the vehicle travels. In this case, the MDPS control unit 20 may receive the column torque whose noise is removed through a low frequency pass filter.

After receiving the driving information of the vehicle at step S20, at step S30, the MDPS control unit 20 determines whether a driver intervenes in steering.

In this case, the MDPS control unit 20 may receive the input steering angle, motor steering angle and column torque, and may determine whether the driver intervenes in steering, based on a result of the comparison between the retention times of the column torques and the phases of the steering angle and motor steering angle.

That is, if the column torque is maintained to a set torque or more for a set time or more and the phase of the steering angle is faster based on a result of the comparison between the phases of the steering angle and the motor steering angle, the MDPS control unit 20 may determine that the driver has intervened in steering.

When a driver intervenes in steering during autonomous driving, a column torque rises due to the torsion of a torsion bar (not illustrated) if steering is rapidly performed in a direction opposite or equal to an autonomous driving direction. Accordingly, whether a driver intervenes in steering may be determined based on the column torque, but the column torque may rise due to the driver's unintended steering wheel touch or tire shaking according to a road condition. In the present embodiment, in order to more accurately determine whether a driver intervenes in steering, the MDPS control unit 20 compares the phases of a steering angle and a motor steering angle.

If a driver performs steering, a steering angle measured in a steering wheel has a faster phase than a motor steering angle calculated in the driving motor 30. In contrast, in the case of autonomous driving, a motor steering angle calculated in the driving motor 30 has a faster phase than a steering angle measured in the steering wheel.

Accordingly, the MDPS control unit 20 may determine whether a driver intervenes in steering, based on the steering angle or motor steering angle having a faster phase by comparing the phases of the steering angle and the motor steering angle.

If it is determined at step 30 that the driver has not intervened in steering, the MDPS control unit 20 returns to step S100 while maintaining the autonomous driving mode and drives the driving motor 30 based on the autonomous driving command.

In contrast, if it is determined at step 30 that the driver has intervened in steering, the MDPS control unit 20 computes a driver command according to the driver' steering based on input driving information (S40).

The MDPS control unit 20 may compute the driver command according to the driver' steering based on the input vehicle speed, steering angle and column torque. That is, when the driver performs steering in the driver mode, the MDPS control unit 20 may generate an auxiliary power.

At step S40, the MDPS control unit 20 may compute the driver command according to the driver' steering based on the vehicle speed, steering angle and column torque of the driving information. Furthermore, at step S50, the MDPS control unit 20 computes a compensation output between the autonomous driving command and the driver command by applying the weighting according to the steering angular speed.

In the present embodiment, when an operation mode switches due to a driver's intervention in steering, the MDPS control unit 20 may determine a blending cycle and weighting for compensating for an autonomous driving command and a driver command based on a steering angular speed.

As illustrated in FIG. 3, a blending cycle Bt is configured based on steering angular speeds in a table form in an exponential function way. If a driver wants sudden steering, the blending cycle Bt is reduced and thus weighting is immediately changed. If a steering angular speed is slow, the blending cycle Bt is increased and thus weighting is slowly changed. Accordingly, an operation mode can switch without a sense of difference.

After the blending cycle and the weighting are determined as described above, the MDPS control unit 20 may compute a compensation output in such a way as to compensate for the autonomous driving command and the driver command by applying the weighting based on the determined blending cycle, and may output the compensation output.

That is, the MDPS control unit 20 may compute the compensation output using an equation [(1−weighting)*autonomous driving command+weighting*driver command] while increasing weighting from 0 to 1 based on the blending cycle.

In this case, if the weighting is 0, the autonomous driving command may be computed as the compensation output of 100%. If the weighting is 1, the driver command may be computed as the compensation output of 100%.

After the compensation output is computed at step S50, the MDPS control unit 20 makes a mode transition from the autonomous driving mode to the driver mode while driving the driving motor 30 using the compensation output (S60).

Accordingly, if a mode rapidly switches or fast transition is not necessary depending on a driver' steering angular speed for each situation, outputs may be slowly blended, and thus a smooth sense of steering can be provided when the autonomous driving mode switches to the driver mode.

As described above, the apparatus and method for controlling an MDPS apparatus according to embodiments of the disclosure can maximize user convenience and safety because an autonomous vehicle can make a mode transition without a sense of difference and noise robustness against a command steering angle in an autonomous driving mode can be improved by more clearly determining whether a driver intervenes in steering, when a mode of the autonomous vehicle switches from the autonomous driving mode to a manual mode and adjusting a transition speed based on an autonomous driving situation.

Furthermore, an implementation described in this specification may be realized as a method or process, apparatus, software program, data stream or signal, for example. Although the disclosure has been discussed only in the context of a single form of an implementation (e.g., discussed as only a method), an implementation having a discussed characteristic may also be realized in another form (e.g., apparatus or program). The apparatus may be implemented as proper hardware, software or firmware. The method may be implemented in an apparatus, such as a processor commonly referring to a processing device, including a computer, a microprocessor, an integrated circuit or a programmable logic device, for example. The processor includes a communication device, such as a computer, a cell phone, a portable/personal digital assistant ("PDA") and another device which facilitates the communication of information between end-users.

The present disclosure has been described above based on the embodiments illustrated in the accompanying drawings, but the embodiments are merely illustrative. A person having ordinary skill in the art to which the present disclosure pertains will understand that various modifications and other equivalent embodiments are possible from the embodiments.

Accordingly, the true technical range of protection of the present disclosure should be determined by the technical spirit of the following claims.

What is claimed is:

1. An apparatus for controlling a motor-driven power steering (MDPS) apparatus, the apparatus comprising:
   a driving information input unit configured to receive driving information generated while a vehicle travels;
   a steering angle location control unit configured to receive a command steering angle for autonomous driving and a current motor steering angle of a driving motor and to output an autonomous driving command through location control; and
   an MDPS control unit configured to:
      drive the driving motor based on the autonomous driving command received from the steering angle location control unit in an autonomous driving mode;
      determine whether a driver intervenes in steering, based on the driving information received from the driving information input unit during the autonomous driving;
      compute a driver command according to the driver' steering based on a result of the determination on whether the driver intervenes in steering;
      compute a compensation output between the autonomous driving command and the driver command by applying a weighting according to a steering angular speed; and
      make a mode transition from the autonomous driving mode to a driver mode while driving the driving motor,
   wherein the MDPS control unit is further configured to:
      determine a blending cycle and weighting to compensate for the autonomous driving command and the driver command based on the steering angular speed; and
      compute the compensation output in such a way that the weighting is applied based on the determined blending cycle to compensate for the autonomous driving command and the driver command.

2. The apparatus of claim 1, wherein the driving information input unit receives any one or more of a vehicle speed, the motor steering angle of the driving motor, and a steering angle, steering angular speed and column torque according to the driver' steering, while the vehicle travels.

3. The apparatus of claim 1, wherein the steering angle location control unit receives error values of the command steering angle and motor steering angle and filters out the error values through a variable high-pass filter for varying a cutoff frequency based on a command steering angular speed, adjusts a location control gain, and output the autonomous driving command.

4. The apparatus of claim 3, wherein the steering angle location control unit lowers the cutoff frequency when the command steering angular speed is high and raises the cutoff frequency when the command steering angular speed is low.

5. The apparatus of claim 1, wherein the MDPS control unit comprises:
   a steering controller configured to compute the driver command according to the driver' steering based on a vehicle speed, steering angle and column torque received from the driving information input unit;

a steering intervention determination unit configured to receive the steering angle, the motor steering angle and the column torque and to determine whether the driver intervenes in steering, based on a result of a comparison between retention times of the column torques and phases of the steering angle and motor steering angle;

a weighting calculator configured to determine the blending cycle and the weighting for compensating for the autonomous driving command and the driver command based on the steering angular speed when an operation mode switches; and an output controller configured to perform the computation of the compensation output when the steering intervention determination unit determines that the driver has intervened in steering and to output the compensation output.

6. The apparatus of claim 5, wherein the steering intervention determination unit determines that the driver has intervened in steering if the column torque is maintained to a set torque or more for a set time or more and the phase of the steering angle is faster as a result of a comparison between the phases of the steering angle and the motor steering angle.

7. The apparatus of claim 5, wherein the output controller computes the compensation output using an equation [(1−weighting)*autonomous driving command+weighting*driver command] while increasing the weighting from 0 to 1 based on the blending cycle.

8. A method of controlling a motor-driven power steering (MDPS) apparatus, the method comprising:
receiving, by an MDPS control unit, an autonomous driving command from a steering angle location control unit and driving a driving motor in an autonomous driving mode;
determining, by the MDPS control unit, whether a driver intervenes in steering, based on driving information received from a driving information input unit during autonomous driving;
computing, by the MDPS control unit, a driver command according to the driver' steering if it is determined that the driver has intervened in steering;
computing, by the MDPS control unit, a compensation output between the autonomous driving command and the driver command by applying weighting according to a steering angular speed; and making a mode transition, by the MDPS control unit, from the autonomous driving mode to a driver mode while driving the driving motor using the compensation output, wherein the computing of the compensation output comprises:
determining, by the MDPS control unit, a blending cycle and weighting to compensate for the autonomous driving command and the driver command based on the steering angular speed; and
computing, by the MDPS control unit, the compensation output in such a way that the weighting is applied based on the determined blending cycle to compensate for the autonomous driving command and the driver command.

9. The method of claim 8, wherein the determining of whether the driver intervenes in steering comprises:
receiving, by the MDPS control unit, a steering angle, a motor steering angle and a column torque, and
determining that the driver has intervened in steering if the column torque is maintained to a set torque or more for a set time or more and a phase of the steering angle is faster as a result of a comparison between the phases of the steering angle and the motor steering angle.

10. The method of claim 8, wherein the computing of the compensation output comprises computing, by the MDPS control unit, the compensation output using an equation [(1−weighting)*autonomous driving command+weighting*driver command] while increasing the weighting from 0 to 1 based on the blending cycle.

11. The method of claim 8, further comprising:
receiving, by the steering angle location control unit, error values of the command steering angle and motor steering angle and
filtering out the error values through a variable high-pass filter for varying a cutoff frequency based on a command steering angular speed;
adjusting a location control gain; and
outputting the autonomous driving command to the MDPS control unit.

12. The method of claim 11, wherein when varying the cutoff frequency, the steering angle location control unit lowers the cutoff frequency when the command steering angular speed is high and raises the cutoff frequency when the command steering angular speed is low.

* * * * *